(12) United States Patent
Goldberg et al.

(10) Patent No.: US 10,810,256 B1
(45) Date of Patent: Oct. 20, 2020

(54) PER-USER SEARCH STRATEGIES

(71) Applicant: Amazon Technologies, Inc., Seattle, WA (US)

(72) Inventors: Matthew E. Goldberg, Amsterdam (NL); Simon Martin, The Hague (NL); Mark Swaanenburg, Rijswijk (NL); Robin van den Kerkhoff, Lisse (NL)

(73) Assignee: Amazon Technologies, Inc., Seattle, WA (US)

( * ) Notice: Subject to any disclaimer, the term of this patent is extended or adjusted under 35 U.S.C. 154(b) by 96 days.

(21) Appl. No.: 15/627,011

(22) Filed: Jun. 19, 2017

(51) Int. Cl.
  *G06F 16/00* (2019.01)
  *G06F 16/901* (2019.01)
  *G06F 16/903* (2019.01)

(52) U.S. Cl.
  CPC ...... *G06F 16/901* (2019.01); *G06F 16/90335* (2019.01)

(58) Field of Classification Search
  CPC ....................................................... G06F 16/00
  See application file for complete search history.

(56) References Cited

U.S. PATENT DOCUMENTS

| | | | |
|---|---|---|---|
| 2003/0171914 A1* | 9/2003 | Jung | G06F 16/3338 704/7 |
| 2008/0294597 A1* | 11/2008 | Bourdoncle | G06F 16/328 707/999.002 |
| 2010/0100543 A1* | 4/2010 | Brady | G06F 16/31 707/732 |
| 2011/0137912 A1* | 6/2011 | Ragusa | G06F 16/313 707/741 |
| 2013/0018891 A1* | 1/2013 | Busch | G06F 16/319 707/742 |
| 2015/0127491 A1* | 5/2015 | Duggar | G06F 16/337 705/26.62 |
| 2016/0378634 A1* | 12/2016 | Jovanovic | G06F 11/3034 707/688 |

* cited by examiner

*Primary Examiner* — Khanh B Pham
(74) *Attorney, Agent, or Firm* — Davis Wright Tremaine LLP

(57) ABSTRACT

A search server may receive a request to generate a set of indexes based at least in part on content associated with a user. The search server may generate a set of segments to divide the content. For a particular segment the search service then selects an indexing strategy to be used to generate an index for the particular segment. Other indexing strategies may be used to generate indexes for other segments. In addition, along with storing the index, the search server may store information indicating an association with the particular segment and the selected indexing strategy.

20 Claims, 9 Drawing Sheets

PER-USER SEARCH STRATEGIES

BACKGROUND

Computers of the organization, for instance, may communicate with computers of other organizations to access and/or provide documents or other data while using services of another organization. In many instances, organizations configure and operate remote networks using hardware managed by other organizations, thereby reducing infrastructure costs and achieving other advantages. With such configurations of computing resources, ensuring that access to the resources and the data they hold can be challenging, especially given the multitude of different computing systems, for example, computers of the organization may include Personal Computers, Tablets, Smartphones, Laptops, and other devices. Ensuring that users can interact with documents is challenging given the variety of hardware and software components of different devices. Furthermore, it is challenging to ensure that users can locate and search documents distributed between various computer systems.

BRIEF DESCRIPTION OF THE DRAWINGS

Various techniques will be described with reference to the drawings, in which.

DETAILED DESCRIPTION

Figure 1:
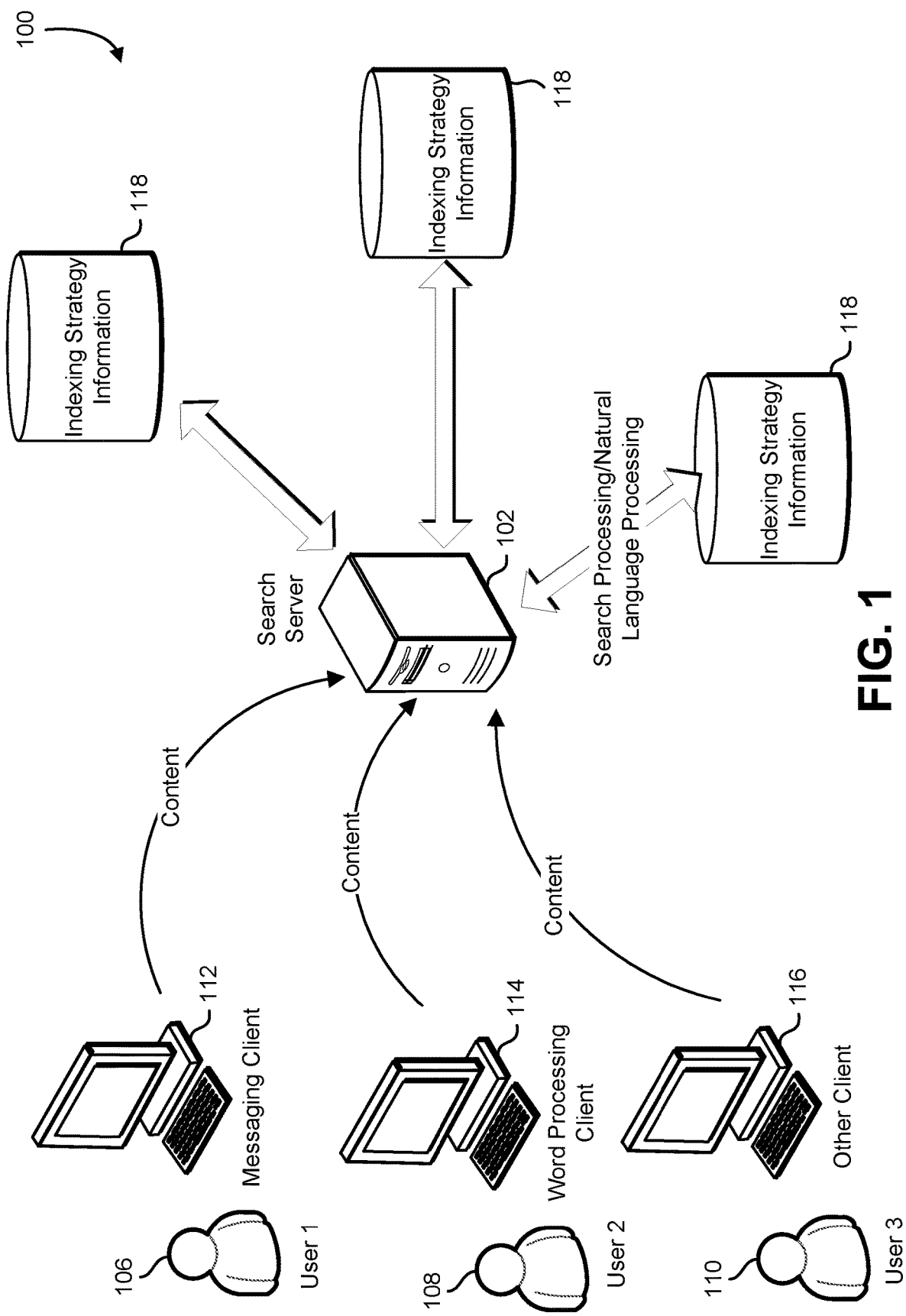
FIG. 1 illustrates an environment in which content from various users is indexed using a plurality of indexing strategies in accordance with at least one embodiment.

In various examples described below, a search system enables efficient searching of content by users in a service provider environment while providing a mechanism for refining and improving indexing and searching strategies. In some examples, a service provider provides a messaging service (e.g., an electronic mail (email) service) that retains messages owned by a variety of different users and assigns indexing strategies and/or search strategies on a per user basis.

To facilitate efficient searching, the computing resource service provider may operate a search server that creates and maintains an index of the retained content. In various embodiments, the content is divided into one or more segments and each segment of content is then indexed according to different indexing strategies. In some examples, an index is created for each individual user or a group of users. In addition, particular search strategies may be selected based at least in part on the indexing strategy for a particular segment. For example, a particular indexing strategy using lemmatization may work well with a particular search strategy and/or search engine; therefore, when searching a particular segment indexed using lemmatization the particular search strategy and/or search engine is selected to process the user's query.

In various embodiments, searching content involves converting incoming content (e.g. content generated and/or provided by the user) into a set of tokens according to an indexing strategy, persisting the token in an index, and transforming a user's input into a query that can be executed against that index. As described in greater detail below, there are various strategies that can be applied at each of these steps. For example, converting documents into tokens could use various indexing strategies such as stemming strategy, lemmatization strategy, and/or various different cryptographic algorithms. In another example, indexes could be based at least in part on a particular search engine including a query syntax that allows users to specify keywords. In addition to utilizing a plurality of indexing and search strategies in various embodiments, the search server collect metrics and other information indicating result of query operations and uses the metric information to refine, modify, discontinue use, and/or add new indexing and search strategies. For example, the search server modifies prefix length for various stemming indexing strategies and evaluates, based at least in part on metric, the effectiveness of the various prefix lengths.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments may be practiced. The environment 100 includes a search server 102 that maintains indexing strategy information. In addition, the search server 102 may be a component of a service or application provided by a computing resource service provider. For example, the search server 102 may be a component of a messaging service or document collaboration system. In some embodiments, the search server 102 is a component of an email server serving multiple users. In another embodiment, the search server 102 is a component of an instant messaging server. In yet another embodiment, the messaging server is a component of a text messaging router in a cellular network. In various examples, the messaging service may be an email service, an instant messaging service, a chat room service, or a video conferencing service. In some implementations, the methods described in this document are applied to a document sharing service, a source code management service, a web content management service, or content management service. The indexing and searching strategies described in the present disclosure may be applied to content in general and are not limited to emails, messages, documents, or source code.

The search server 102, as illustrated in FIG. 1, maintains a set of index strategy information data stores 118. The set of index strategy information data stores 118 may be a storage device within the search server 102 or an external storage device accessible to the search server 102. In various embodiments, the storage device includes computing resources provided by a service of the computing resource service provider such as an on-demand storage service or database service. Furthermore, the set of index strategy information data stores 118 may include a set of databases. In an embodiment, the set of index strategy information data stores 118 retains email, text messages, documents, or other messages handled by the search server 102 as well as information indicating segments of content (e.g., the email, text messages, documents, or other messages handled by the search server 102), indexing strategies used to generate indexes for segments of contents, and search strategy information. Although there is a plurality index strategy information data store 118 illustrated in FIG. 1, the information contained in the data store may be consolidated into a single data store. In some implementations, the strategy information data store 118 retains messages in an encrypted format. Content, in various embodiments, includes content items which include individual documents, e-mails, files, or other data objects that contain textual content. For example, a user's content includes all of the user's e-mails, while a content item includes a particular e-mail. As described in the present disclosure, indexing and/or search strategies include sets of rules, heuristics, decision trees, algorithms, logic, or any other construct defining a set of operations and/or actions to generate tokens based at least in part on language elements (e.g., words or other combinations of characters).

The search server 102 may be accessed by a number of users. In the example shown in FIG. 1, a first user 106, a second user 108, and a third user 110 access the search server 102 via a first messaging client 112, a word processing client 114, and another client 116. Each of the clients may be applications executed by a personal computer system, a laptop computer system, a cell phone, a mobile device, a tablet computer, or other messaging device capable of communicating with the search server 102. In some examples, the users are users within a particular company, and the company acquires messaging services from a computing resource service provider which provides the search server 102. In other examples, the users are different users from different companies, and each of the different companies acquires messaging services from a computing resource service provider.

The search server 102 provides search capabilities to each of the users by generating and maintaining a search index. In various examples, the search index may be a token map, a binary tree, ordered list, hash table, relational database, or other structure arranged to provide improved search performance. The search index is generated from the content items obtained by the search server 102. To generate the index, the search server 102 tokenizes the plaintext version of each message to produce a set of tokens. Each message is tokenized by dividing the message into a collection of words or character sequences that are separated by any of an identified set of delimiter characters. In many implementations, the set of delimiter characters includes whitespace, punctuation, and non-printable characters such as carriage returns and line feeds. For example, if the present paragraph were tokenized, the resulting set of tokens would be the words in this paragraph. Each token in the set of tokens is converted to a corresponding value. In some implementations, the value is a hash. In other implementations, the value is a cryptographic hash. In yet another implementation, the value is a message authentication code. In yet another implementation, the value is a random value defined in a token-to-value dictionary. Each value in the resulting set of values is stored in the search index in association with a document identifier. The document identifier may be a document name, a file handle, or hash based on the document name or file handle. In general, it is not practical for an attacker to re-create a particular plaintext document given access to the search index.

The search index allows the search server 102 to provide efficient search capabilities to users of the search server 102. When a particular user submits the search request to the search server 102, the search server 102 converts the terms of the search request to values using a cryptographic hash or other method corresponding to the conversion algorithm used when generating the search index. The resulting values of the search request correspond to the values in the search index. The search server 102 then uses the search index to identify a set of document identifiers that contain values matching the search terms. Search parameters such as logic between terms can be applied to further refine the set of document identifiers that satisfy the search. In some implementations, the search index includes separate search indexes for each user or separate search indexes for groups of user of the search server 102. The search server 102 may also identify documents associated with the document identifiers and returns those documents to a particular user.

To generate the index for a particular user, content associated with the particular user or group of users of which the user is a member is tokenized and processed. In various embodiments, tokenization involves parsing content items to generate a number of words or phrases. In some examples, a token may represent a phrase, language element, file component, or other parse-able portion of a message. In another example, a token may represent a normalized version of a word, phrase, language element, file component, or parse-able message portion. Normalization may be accomplished, for example, by standardizing the case of the characters in a word or by expanding abbreviated words or phrases in a document. In various other embodiments, the tokens are generated by a process of stemming or lemmatization. The processes of generating tokens and/or indexes, as described in the present disclosure, may be referred to as an indexing strategy. As described in greater detail below, different indexing strategies may be used from different users and/or groups of users. In addition, different indexing strategies may be used on different segments of content associated with the dame user. For example, a bilingual user has a first indexing strategy applied to content items in a first language and a second indexing strategy applied to content items in a second language.

In addition, a particular document may include portions that are neither parsed as tokens nor used as delimiters. In some embodiments, the tokens generated based at least in part on content are converted to values based on a token map. For example, the token map is created by generating a dictionary of tokens that are present in the particular user's content to random or pseudorandom values. In other examples, values are created by generating a cryptographic hash, message authentication code ("MAC"), or hashed message authentication code ("HMAC") for tokens present in the particular user's content. The processed content associated with a particular user is processed to generate a search index linking values to messages, and the index is retained by the service provider or component thereof such as a search engine. In various examples, the index may be stored as a binary tree, hash table, hash tree, ordered list, or other structure that enables rapid searching.

As described in greater detail below, when a search request is submitted, the service provider converts the search terms in the search request to tokens in accordance with a search strategy compatible with the indexing strategy used to generate the index and searches for the tokens using the index. For example, if a stemming indexing strategy is used to generate the index, the search server 102 uses a searching strategy that uses stemming to generate search tokens. The search server 102 or component thereof, such as an indexing manager, may determine a particular indexing strategy to use for a particular segment of content items. In various embodiments, the indexing strategy for a user, segment of content items, or new segment of content items is modified or replaced with a new indexing strategy. As described in greater detail below, the search server 102 may obtain metrics associated with a particular indexing strategy and may determine to modify or replace the particular indexing strategy based at least in part on the metrics. In some embodiments, information indicating the indexing strategies and metrics is provided to a machine learning algorithm, and the machine learning algorithm then returns information indicating whether particular indexing strategies should be modified or replaced. In addition, these machine learning techniques may be applied to particular searching strategies associated with particular indexing strategies.

In some embodiments, the search server 102 maintains profile information for users and selects indexing strategies based at least in part on profile information. For example, if the user's profile indicates the user is an executive, the search server 102 may select a particular indexing strategy that was previously shown to work well for executives. Furthermore, the search server 102 may select a particular indexing strategy based at least in part on the type of content. For example, particular indexing strategies may work well for e-mails as opposed to documents. In an embodiment, the search server 102 dynamically determines indexing strategies for users and/or segments of content associated with users. For example, 90% of a user's content is indexed using a first indexing strategy and 10% of the user's content is indexed using a second indexing strategy, and over time the percentages shift as the second indexing strategy provides more relevant search results to the user.

Figure 2:
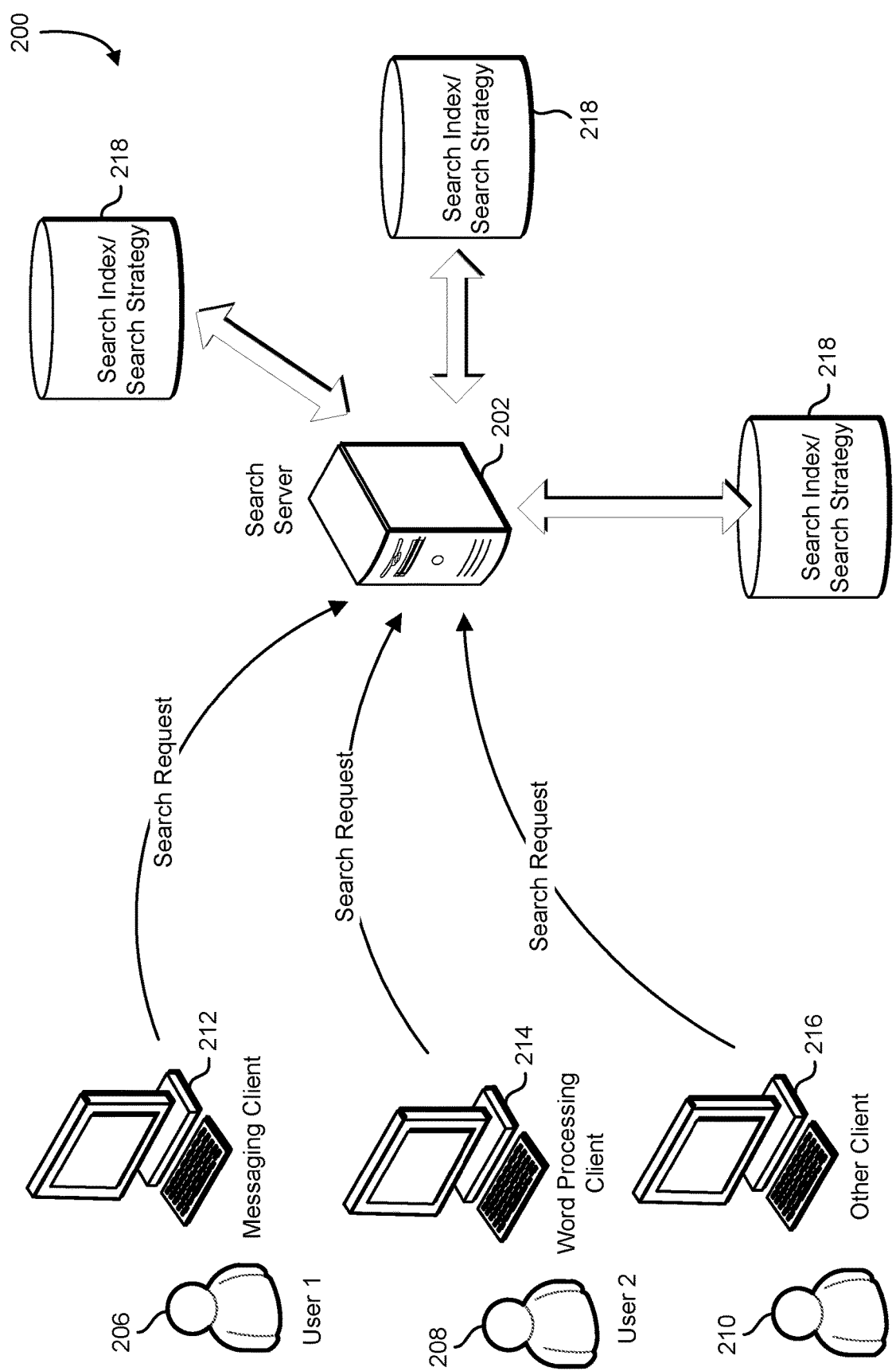
FIG. 2 illustrates an environment in which various users submit search requests which are process using a plurality of searching strategies in accordance with at least one embodiment.

FIG. 2 shows an illustrative example of an environment 200 in which various embodiments may be practiced. The environment 200 includes a search server 202 that maintains search indexes generated based at least in part on a plurality of indexing strategies and executes search queries provided by users. As described above, the search server 202 may be a component of a service or application provided by a computing resource service provider. In one example, the search server 202 is a component of a messaging service or document collaboration system. The search sever 202 may include computing resources that index content of users as described above in connection with FIG. 1. For example, the search server 202 maintains a set of index strategy information data stores which include information indicating a particular indexing strategy used to generate search indexes for a particular segment of content items. As described above and illustrated in FIG. 2, the search server maintains a set of search indexes 218. The search indexes 218 in various embodiments may include any index as described in the present disclosure.

The search server 202 may be accessed by a number of users. In the example shown in FIG. 2, a first user 206, a second user 208, and a third user 210 access the search server 1202 via a messaging client 212, a word processing client 214, and another client 216. Each of the clients may be applications executed by a personal computer system, a laptop computer system, a cell phone, a mobile device, a tablet computer, or other messaging device capable of communicating with the search server 202. In some examples, the users are users within a particular company, and the company acquires messaging services from a computing resource service provider which provides the search server 202. In other examples, the users are different users from different companies, and each of the different companies acquires messaging services from a computing resource service provider.

The search server 202, as described above, provides search capabilities to each of the users by generating and maintaining a search index. Furthermore, the search server 202 may process the user search request using different search strategies based at least in part on the indexing strategy used to generate the search index 218. In addition, the search indexes 218 may correspond to a particular segment of content. For example, the e-mails for a particular user may be indexed in accordance with a first indexing strategy to generate a set of search indexes stored by the search server 202. When the search sever 202 receives a search request from the particular user to search their e-mails, the search server queries an indexing information data store to determine the indexing strategy associated with the user's e-mails and selects a search strategy compatible with the indexing strategy. A compatible search strategy may include a variety of different search strategies that generate tokens which can be used to search indexes generated in accordance with a particular indexing strategy.

In various embodiments, content is divided into a plurality of segments with indexes generated for the plurality of segments using a plurality of different indexing strategies. Therefore, in these embodiments, different search strategies are used to generate search results by at least generating tokens, based at least in part on the search request, for the plurality of different indexing strategies and combining the result of the different search strategies. For example, a first segment of content is indexed according to a first indexing strategy and a second segment of content is indexed according to a second indexing strategy. In response to a search request including a search of the first and second segment of content, the search server 202 generates search tokens using a first search strategy compatible with the first indexing strategy and a second search strategy compatible with the second indexing strategy. The search server 202 then executes a search of the indexes of the first segment using the tokens generated based at least in part on the first search strategy and a search of the indexes of the second segment using tokens generated based at least in part on the second search strategy and combines the results to provide a response to the user's search request.

In yet other embodiments, different search strategies are used, results combined and ordered according to a ranking algorithm for relevance. In addition, ranking of search results may be normalized when combining the results of two or more search strategies. As described in greater detail below, the search server 202 may select a particular search strategy from a set of search strategies compatible with a particular indexing strategy. In various embodiments, the search server 202, for new users, attempts to utilize many different indexing strategies and search strategies to collect metrics on a plurality of combinations of indexing strategies and search strategies to determine effective indexing strategies and search strategies for users.

In various embodiments, the search server 202 executes a plurality of document ingestions to generate indexes based at least in part on different indexing strategies. These ingestions may be initiated by the user, the search server, or other computer systems or services of the computing resource service provider. When searching those indexes, the search server 202 may query the indexing strategy database as described above to determine segments of content and indexing strategies for the segments of content. In some embodiments, the search server performs a search of the segments (e.g., indexes associated with the segments) in parallel. The search server may then merge the results of the searches, return all of the results, omit a portion of the results, order a portion of the results, or otherwise format the results for presentation to the user. As described in greater detail below, the search server 202 may then return the results to the client application (e.g., a web frontend directly).

Figure 3:
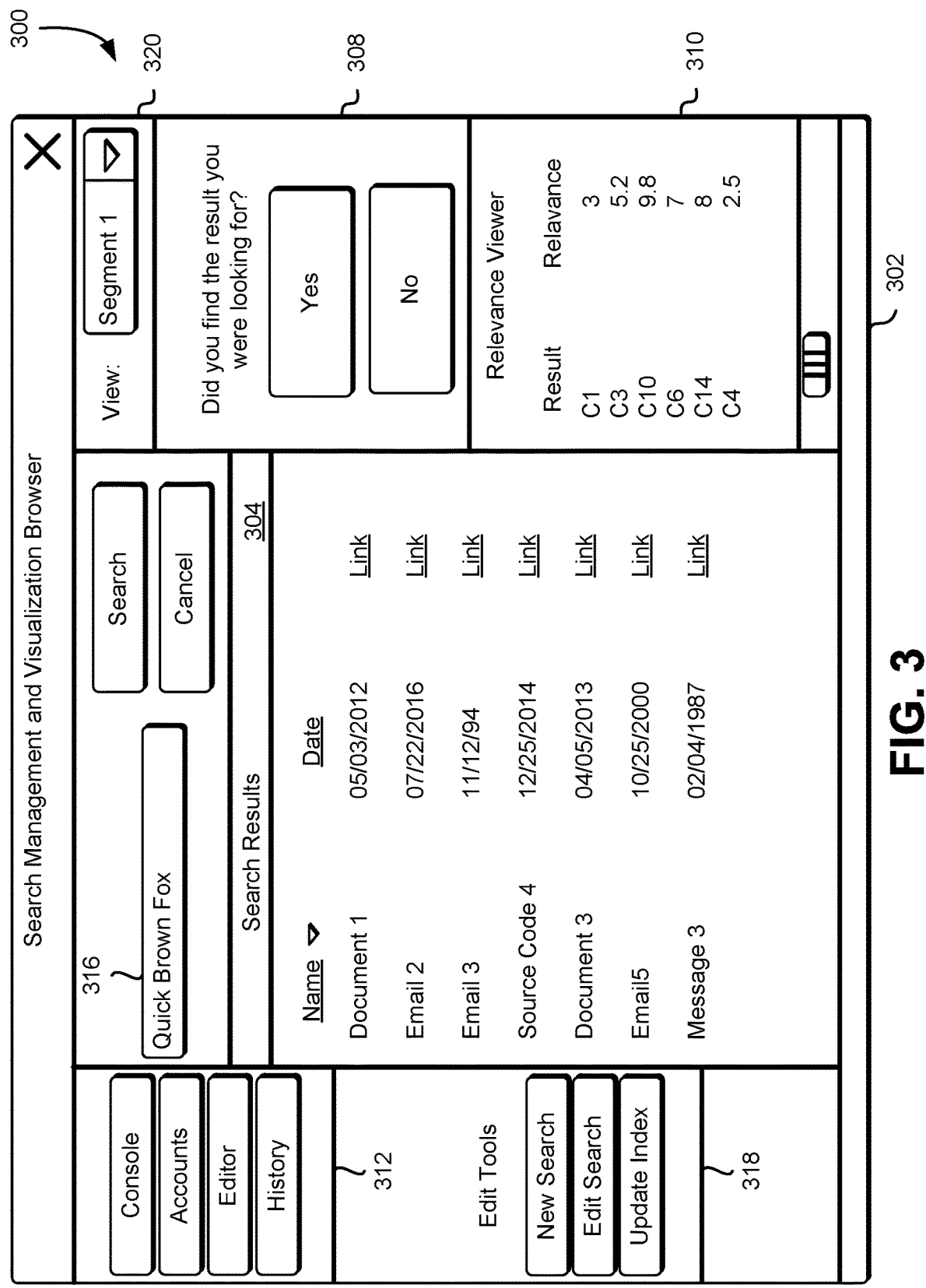
FIG. 3 is a diagram illustrating a management console exposed as a webpage for returning search results executed using a plurality of searching strategies in accordance with at least one embodiment.

FIG. 3 illustrates an example environment 300 where a search management and visualization browser 302 may be used to search content and provide metrics and other information to a search server in the present disclosure at least as described above in connection with FIGS. 1 and 2 and in accordance with at least one embodiment. The search management and visualization browser 302 enables users to search content, provide feedback, access content, provides metrics, and/or perform various operations associated with search functionality described in the present disclosure. In various embodiments, the search management and visualization browser 302 is a computer system service such as a web service and is provided as a moderator service of the computing resource service provider as described in the present disclosure.

As illustrated in FIG. 3, the search management and visualization browser 302 is provided as a user interface executed by an application, such as a web browser executing on a computer system operated by the user, as well as other user interfaces that may be used to present service information and relationship information to the user and may, in some embodiments, be generated by the computing resource service provider and sent to the user's display for rendering. In other embodiments, the user's computing device may include functionality to generate some or all portions of the user interface. For example, the user's web browser may include code for generating some of the graphics for rendering data received from the computing resource service provider. The computing resource service provider may receive the selection information from the user's computing device and provide the information to other computing resources of the search server. For example, the user provides a search query which causes the computing resource executing the search management and visualization browser 302 to transmit the query to a search server to be processed. The user interface may be generated or caused to be generated by the search server or other service providing the search server as described in the present disclosure.

The search management and visualization browser 302 may include a search bar 316 that allows users to provide search queries and or operations for searching content using the search query through the search management and visualization browser 302. For example, the search bar 316 includes a graphical user interface element, such as the "search" and "cancel" buttons illustrated in FIG. 3, where selection of the graphical user interface element may cause the search service to display information to the user based at least in part on the provided search query. Although not shown in FIG. 3 for simplicity, various search parameters may be provided by the user through the search management and visualization browser 302. For example, the user may search a portion of the content, fields in the content, indicate that particular words in the search query must all be present, specify wild cards, specify Boolean operations, specify word forms, include prefix and/or suffix, match case, ignore words and/or characters, indicate special characters, or any other search parameters.

The search management and visualization browser 302 may include a search bar 316 that allows users to provide search queries and/or operations for searching content using the search query through the search management and visualization browser 302. For example, the search bar 316 includes a graphical user interface element, such as the "search" and "cancel" buttons illustrated in FIG. 3, where selection of the graphical user interface element may cause the search service to display information to the user based at least in part on the provided search query. Although not shown in FIG. 3 for simplicity, various search parameters may be provided by the user through the search management and visualization browser 302. For example, the user may search a portion of the content, fields in the content, indicate that particular words in the search query must all be present, specify wild cards, specify Boolean operations, specify word forms, include prefix and/or suffix, match case, ignore words and/or characters, indicate special characters, or any other search parameters.

In various embodiments, selection of the search button in the search bar 316 causes a search request to be transmitted to the search server and search results to be returned in response. In yet other embodiments, searches are performed as characters and/or words are entered into the search bar 316. As illustrated in FIG. 3, these results are displayed in the search results pane 304. As described in greater detail above, this result may be generated by a plurality of search strategies and ordered or otherwise presented to the user in the search results display pane 304 in accordance with various ranking algorithms. For example, the results may be ordered based at least in part on a date associated with a particular content or a name of a particular content.

In various embodiments, the search management and visualization browser 302 produces the graphical representation of application information based at least in part on relevance information determined by the search service. For example, the search server causes to be displayed in the search management and visualization browser 302 relevance calculations for various results of various search strategies. In various embodiments, this relevance information provides metrics to determine the effectiveness of particular indexing strategies and/or search strategies. The user of the search management and visualization browser 302, in various embodiments, provides feedback indicating the user's perceived relevance of the information in the relevance viewer 310.

As illustrated in FIG. 3, the search management and visualization browser 302 further includes a set of options 312 used to perform various functions in connection with the search management and visualization browser 302. The set of options 312 may be a set of functions included in the search management and visualization browser 302 that enables a user to perform a variety of operations such as managing accounts, defining content information, and managing the user's profile. The options 312 may be configured as graphical user interface elements of the search management and visualization browser 302.

The account button may be configured to enable the user to select particular accounts to perform various operations associated with a particular service in connection with the selected user accounts. In various embodiments, the user operating the search management and visualization browser 302 is required to have, at the minimum, complete read permissions across all of the user services and computing resources associated with the accounts on which the user is attempting to perform operations associated with the particular service. The editor button may be configured to enable the user to create or edit content.

In various embodiments, the relevance viewer 310 also provides an expanded search for the user. For example, the relevance viewer 310 displays information obtained from a search performed on behalf of the user, displaying additional information and/or content which may be relevant to the search executed in the search bar 316 by the user. This information may include relevant or related search, content, other users, or any other information associated with a search initiated by the user. The information displayed in the relevance viewer 310 may be generated automatically or in response to a request and/or operation of the user. The search management and visualization browser 302 may also include a survey question 308 which prompts the user to provide metric information which may then be used to refine and/or update indexing strategies and/or search strategies. In various embodiments, the survey question 308 includes a set of questions that attempt to illicit the same type of response using different questions. For example, a first survey question asks "did you find the result you were looking for" and a second survey question asks "were you surprised by the results." Both survey questions attempt to ask whether the user found the result relevant but are posed differently.

The user may use editing tools 318 to edit, create, or modify existing information and/or metadata maintained by the search server. For example, the user may use the editing tools 318 to edit a particular search. In addition, the user may be provided with the option to update search indexes associated with the user or a particular segment of content. Once a user has established a connection to the search server service through the search management and visualization browser 302, the search management and visualization browser 302 may automatically populate the user's display with the information in various components of the search management and visualization browser 302, such as the relevance viewer and the search results display pane 304.

As an operation enabled by the search management and visualization browser 302, a user can view different segments of content from a drop-down menu 320. The different segments may include grouping of content. For example, different segments include different documents associated with the user and/or a group of users. Users may navigate to a particular segment using a graphical user interface element as illustrated in FIG. 3. Selection of a particular segment may limit the information and generate views of information specific to the segment.

As illustrated in the search results display pane 304, a search causes the search server to return an identifier to the authoritative content (e.g., a document or e-mail). In another example, the search results displayed are a proper subset of the content that is responsive to the search, which may be ranked by a relevance heuristic which, in some embodiments, is part of the search strategy. In addition, link or other information enabling access to the content is returned. Finally as illustrated in FIG. 3, date information associated with the content is also returned. In addition to the information illustrated in FIG. 3, additional information may be provided, such as all or a portion of the content, a snippet of the content including the search terms, the user associated with the content, a document type associated with the content, or any other information the user may find informative.

In various embodiments, the search management and visualization browser 302 is used to measure how effective different indexing and search strategies of the user are. To this end, the search management and visualization browser 302, in such embodiments, measures user behavior and detects how the user is interacting with the information displayed in the search management and visualization browser 302 and the different indexing and search strategies used to generate the information displayed. In yet other embodiments, the search management and visualization browser 302 provides information to the search server and the search server determines user behavior based at least in part on the information provided by the search management and visualization browser 302. For example, the user creates a new account for a new employee; the search server creates a new index and ties the new index to a particular indexing strategy as described above. When new content is ingested by the search server, the content is indexed in accordance with the particular indexing strategy (e.g., stemming or lemmatization). In addition, different lengths or prefixes may be used in connection with the particular indexing strategy.

In response to a search submitted by the user (e.g., searching the new users documents) and/or new user, a search strategy is selected to search content associated with the new user documents that is compatible with the particular indexing strategy. The search management and visualization browser 302 receives, in response to the search, uniform Resource locators (URLs) that cause the computer executing the search management and visualization browser 302 to generate callbacks to the search sever so that the search sever collects metrics to measure and/or detect operations performed by the user. For example, the rank and/or relevance of the first item the user clicked on. As another example, the metrics information may indicate the number of times the user refined the search query and/or search parameters. The metric information, in various embodiments, is embedded in the URL that is returned to the search server when the user interacts with an element of the search management and visualization browser 302. Additional information, such as the search strategy used, indexing strategy used, user information, the rank and/or relevance of content displayed, and any other information relevant to the search may be returned to the search server.

In various embodiments, the service server receives a stream of events indicating the user interactions with the search management and visualization browser 302. This information may be used to refine or otherwise modify the indexing and search strategies. For example, as described above, this information may be provided to a machine learning engine. In another example, this metrics information indicates the effectiveness of different strategies. When using a first search strategy and a first indexing strategy the average rank of an item of content first selected by the user is 3.7, and when using a second search strategy with the first indexing strategy the average rank of an item of content first selected by the user is 2.2. This information may indicate that the second search strategy is more effective when used in combination with the first indexing strategy than the first search strategy. However, the second search strategy may not be more effective for a certain percentage of users as indicated by the metrics information.

Other metrics information includes operations performed by the user with the content, for example, if the user opened a document, replied to an email, forwarded the email, commented on a document or other operation. In addition, this information may be tracked over an interval of time or over a certain number of searches. For example, when the user executes a search, if the user executes an additional search before the expiration of an interval of time the search is considered part of a single search session and metrics may be generated based at least in part on the search session. If the user executes a large number of searches in a single search session this may indicate that the search strategy is not returning the results the user expects. In another example, searches are considered related based at least in part on the terms and/or content of a search query. In various embodiments, the search management and visualization browser 302 contains executable instructions that, when executed, cause the system executing the search management and visualization browser 302 to monitor to determine if the terms are related. For example, is a user's first search includes the term "dog" and the user's second search includes the term "canine" these searches are defined as related and metrics information indicating the relation is provided to the search server.

In various embodiments, such as those described in greater detail below in connection with FIG. 6, the combinations of different indexing strategies and searching strategies are tested using a variety of queries. In one example, a set of queries is executed using a curated set of content, the set of queries is executed using a first indexing strategy and a first searching strategy and a second indexing strategy and a second searching strategy. The result of each combination of indexing strategies and searching strategies can then be compared to determine relative performance. For example, a list of results not shared between the combinations of indexing strategies and searching strategies is displayed to a user through the search management and visualization browser 302 and the user is provided a user interface element to assign a relevance value to each result. This information may be compared to determine the success of the combinations of the indexing strategies and/or searching strategies relative to each other. In addition, other factors may be used to compare results such as a rank assigned to the results by a searching strategy, a level of relevance attributed to the results (e.g., a result a user defines as highly relevant), and other attributes of the returned results. This information may be displayed in a user interface element, such as table, in the search management and visualization browser 302. Other mechanisms such as machine learning may be used to compare results of various indexing strategies and searching strategies.

Figure 4:
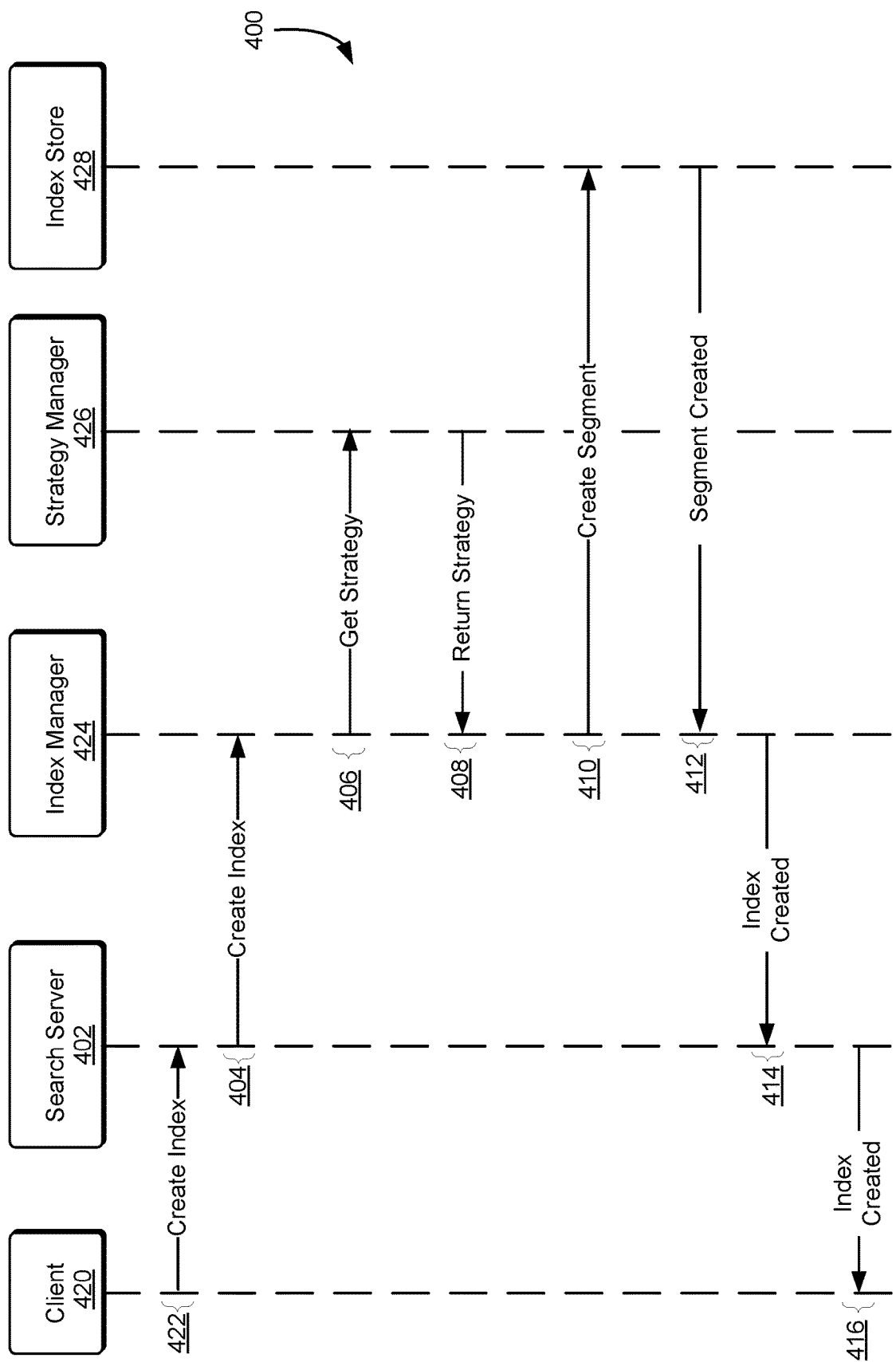
FIG. 4 shows an illustrative messaging diagram which may be used to index user content using a plurality of indexing strategies in accordance with at least one embodiment.

FIG. 4 illustrates a messaging diagram 400 which illustrates different entities in a distributed systems executing operation to generate an index for a segment of content in accordance with at least one embodiment described in the present disclosure. A client 420, which may include a client application executed by a computing resource operated by a user as described above, transmits a request to create an index 422. The search server 402, in various embodiments, includes a request to create a new user or new account associated with a particular service. The request may be received at a search server 402, and the search server 402 may include a search server as described in greater detail above. Furthermore, the request may be received at an interface of the search server 402. In response, the search server 402 forwards at least a portion of the request to an index manager 424 to be used to create an index 404. The index manager 424, in various embodiments, is a component and/or executable code executed by the search server 402. In addition, the index manager 424 may be responsible for managing the indexing strategies associated with various segments and/or users. For example, the index manager 424 determines that 70% of the user's segments will be indexed using a first indexing strategy and 30% will be indexed using a second indexing strategy.

The index manager 424, as part of determining what indexing strategies to assign to particular segments, may obtain one or more strategies 406 from a strategy manager 426. The strategy manager 426 may be a component of the search server 402 or another service. For example, the strategy manager 426 includes a machine learning algorithm that modifies indexing strategies and/or search strategies based at least in part on metrics obtained from various searches as described above. The strategy manager 426, in yet other embodiments, selects a strategy from a set of possible indexing strategies and/or search strategies which is used by the index manager 424 to generate an index for a segment of content. In response, the strategy manager 426 returns strategy information 408. The strategy information 408 may indicate a particular indexing strategy to use to generate an index.

The index manager 424 may then transmit a request to an index store 428 to create a segment 410. As described above, a segment includes a set of documents, emails, source code, or other content described in the present disclosure. Furthermore, the index store 428 may include various storage devices, databases, and/or data stores as described above. The index store 428, may then respond with an indication that the segment has been created 412. The index manager 424 then indicates to the search server that the index has been created 414. Finally, the search server 402 indicates to the client 420 that the index has been created 416. Additional operations not illustrated in FIG. 4 may be performed in accordance with the present disclosure. For example, the search server 402 obtains cryptographic keys which are used to encrypt the indexes. In another example, the index manager generates indexes for content and causes the indexes to be stored in the index store 428.

Figure 5:
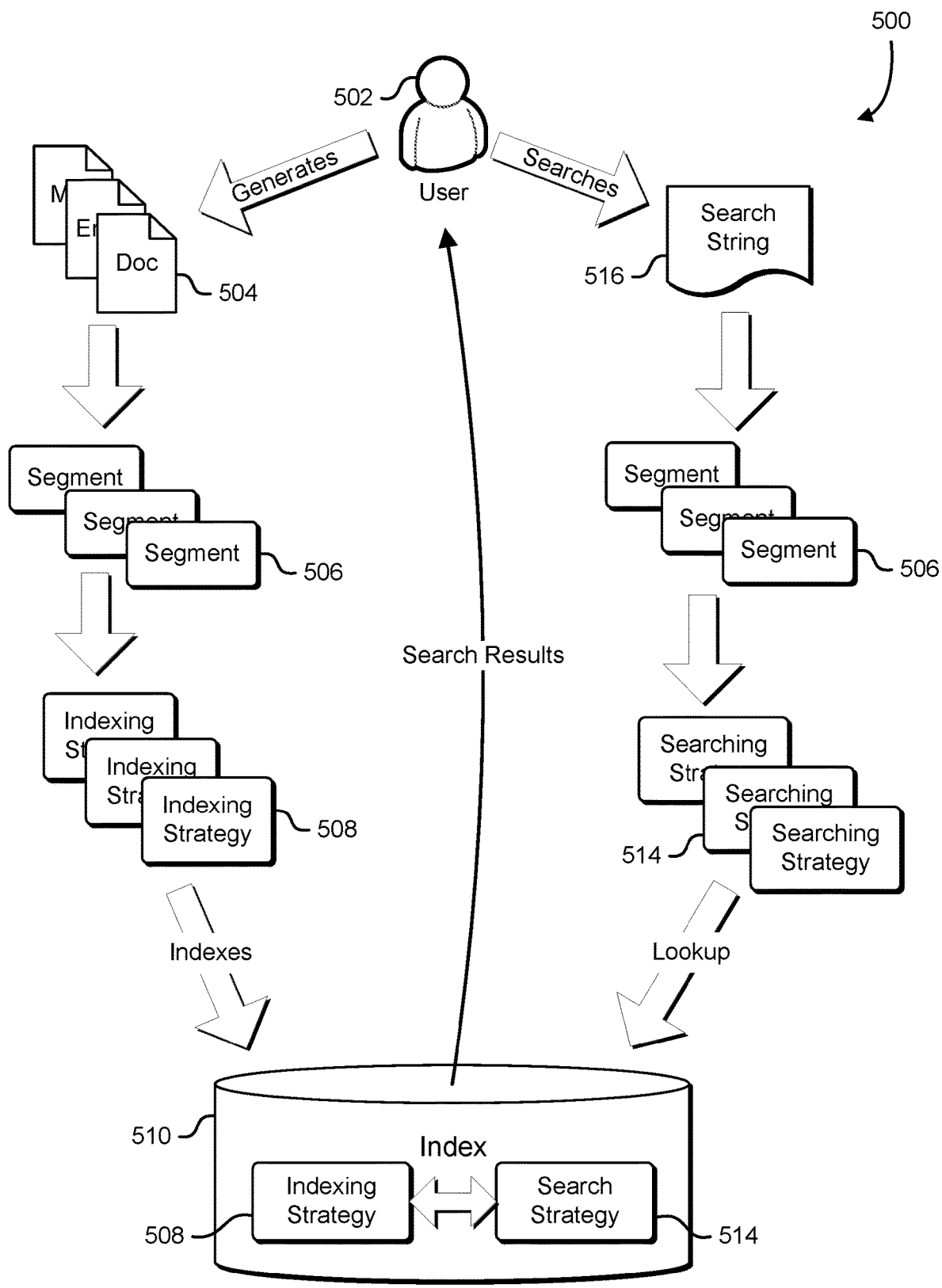
FIG. 5 illustrates an environment in which various users are provided with a plurality of indexing strategies and a plurality of searching strategies in accordance with at least one embodiment.

FIG. 5 shows an illustrative example of a process where a search server creates an index of content (e.g., documents, e-mail, messages, web content, source code, etc.) and uses the index to perform searches that are submitted by the user. A diagram 500 shows two processes initiated by a user 502 that are performed by a search server.

In one process, the user 502 generates a document 504 such as an email document in the search server. The document 504 may be generated by composing an email, receiving an email, sending a text message, receiving a video message, or sending an instant message over the search server. The search server processes the document 504 to produce a set of segments 506. In some examples, the segments include a set of randomly or pseudorandomly selected documents 504. In another example, the segments 506 include documents 504 of a particular type, such as e-mails, or associated with a particular user.

The search server may then select an indexing strategy 508 for one or more segments 506. As described above, the indexing strategy may define an algorithm or other operations which may be used to generate a set of tokens or otherwise create an index. In some examples, the set of tokens is a set of words. In some implementations, the search server produces the set of tokens through a process of tokenization. As described in the present disclosure, tokenization refers to the process of dividing a stream of data into words, phrases, or other meaningful elements called tokens. In some examples, tokenization is accomplished by dividing a stream of text into sequences of printable characters that are separated by whitespace, punctuation and nonprintable characters.

In various embodiments, after extracting the set of tokens from the document 504, the search server converts each token into an associated value such as a hash value. In some implementations, the search server generates a dictionary by assigning a random value to each token. In another implementation, the search server generates a hash value for each token. In yet another implementation, the search server generates a cryptographic hash of each token as the associated value. In the example shown in FIG. 5, the indexing strategy 508 is associated with a search strategy 514. The result is stored in an index 510 in association with information that allows the search server to identify the document 504. In some implementations, a document ID is generated for the document 504 and the index 510 is stored in association with a corresponding document ID. In another implementation, the document 504 is embedded into the index 510, and the document ID may be a pointer to the document 504. In some examples, a single instance of the index 510 may include tokens generated from multiple types of documents. For example, email, chat log, and Web content documents may be tokenized, hashed, and stored in a single index.

In a second process, the user 502 submits a search to the search server in the form of the search string 516. The search string 516 is comprised of one or more search terms and search parameters that provide connective logic between the one or more search terms. For example, the search string 516 may be "A or B and C." The terms of the search string are "A," "B," and "C," and the parameters of the search string are "or" and "and." The search server may determine a set of segments 506 associated with the search string 516. The set of segments 506, in an embodiment, is determined based at least in part on the documents 504 to be searched. As described above, this information may be maintained in a database and queried. In various embodiments, the segments 506 correspond to particular indexing strategies and are used by the search server to inform the selection of a searching strategy 514.

As described above, the searching strategy is selected based at least in part on the indexing strategy used to generate the index 510 such that the tokens generated by the searching strategy 514 may be used to search the index. The search server then tokenizes the terms of the search string 516 to produce a set of tokenized terms. The search parameters and the relationships between the search terms specified by those parameters are preserved. The search server then generates a value for each tokenized term. The value may be generated using a dictionary, a hash function, a cryptographic hash, or other method that matches the method used to generate the resulting set of hashes. Since compatible methods are used to generate the values in the index 510 and the values for the lookup, the index 510 may be used to locate documents that match the submitted search string 516. The search server uses the index 510 and the values to identify sets of documents matching each of the terms of the search string 516 submitted by the user 502. The parameters of the search are applied to each of the sets of documents to produce a final set of document IDs that satisfy the search string 516. For example, if the search string is "A and B," the search server finds the set of document IDs containing term "A" and the set of document IDs containing term "B," and then finds the intersection of the two sets of document IDs to produce the final set of document IDs that satisfies the search string 516.

Figure 6:
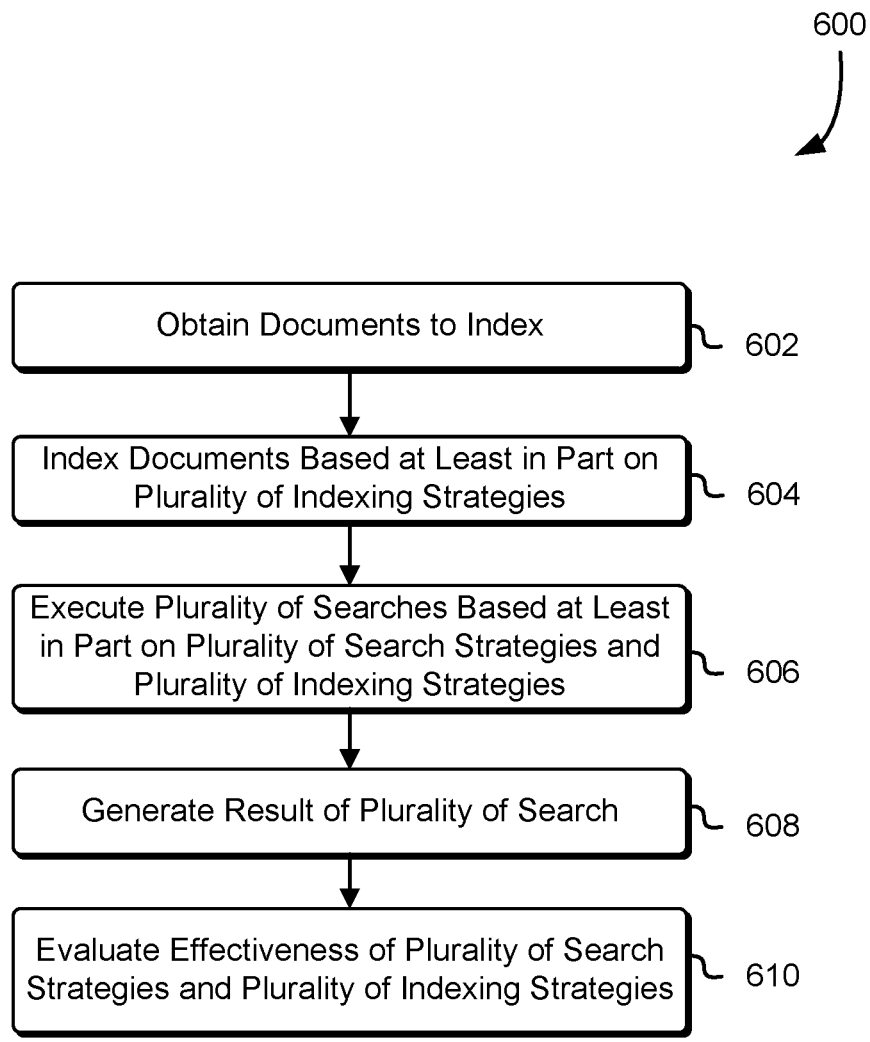
FIG. 6 shows an illustrative process which may be used to evaluate various indexing and searching strategies in accordance with at least one embodiment.

FIG. 6 is a block diagram illustrating an example of a process 600 for evaluating an effectiveness of indexing and/or search strategies in accordance with at least one embodiment. Some or all of the process 600 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 100 described in conjunction with FIG. 1, such as the search server 102, by multiple computing devices in a distributed system of a computing resource service provider, or by a service provided by a computing resource service provider. The process 600 includes obtaining documents to index 602. In various embodiments, the documents include one or more types of content such as e-mails, source code, shared documents, articles, or other documents and/or content. In addition, all or a portion of the documents may be curated and/or fabricated to provide testing data which may be used to test one or more indexing strategies and/or search strategies. In one example, the documents include a set of source code documents representing documents-generated by a security engineer. In another example, the documents include a set of e-mail representing e-mail communications between an executive and other employees. A plurality of sets of documents with different profiles may be maintained and used as testing data by the search server.

In step 604, the search server indexes the obtained document based at least in part on a plurality of indexing strategies. Indexing strategies may include any strategy that generates a set of tokens from the documents. The indexes that are generated may be stored in a data store such that the search server may search the indexes during the executing of one or more searches. In various embodiments, the indexing strategies include new indexing strategies and indexing strategies for which metric information, as described above, has been collected.

In step 606, the search sever executes a plurality of searches based at least in part on a plurality of search strategies and the plurality of indexing strategies. In various embodiments, the searches may include terms and/or queries that have been generated to include known terms from the documents and have previously been tested. This may provide insight into the effectiveness of the indexing and/or search strategies. The search server may execute the plurality of searches in various combinations and/or subcombinations.

In step 608, the search server generates results of the plurality of searches. The results, in various embodiments, include the search results (e.g., a list of documents returned), relevance information, ranking information, duration of the search, or any other information about the execution of the search. Furthermore, the search server may generate a matrix of results (e.g., returned document lists) indicating queries, strategies, and document repository combinations.

In step 610, the results are evaluated for to determine the effectiveness of the plurality of search strategies and the plurality of indexing strategies. In some embodiments, the search server uses machine learning techniques to evaluate the effectiveness. The information generated by machine learning may also be evaluated by a search engineer or other person responsible for generating and testing the plurality of search strategies and the plurality of indexing strategies. In other embodiments, the matrix of results is provided by the search server to an endpoint, such as the webpage described above in connection with FIG. 3, for evaluation. A user may obtain the results displayed in the webpage and annotate the results, the annotations indicating the effectiveness of various search strategies and/or indexing strategies. For example, the user may adjust the relevance ranking up or down depending on the user's perceived relevance of a particular returned document.

Note that one or more of the operations performed in 602-610 may be performed in various orders and combinations, including in parallel. For example, the system executing the process 600 may execute the plurality of searches and generate the results in parallel. In numerous variations to the process 600, one or more of the operations 602-610 may be omitted or performed by other systems or services.

Figure 7:
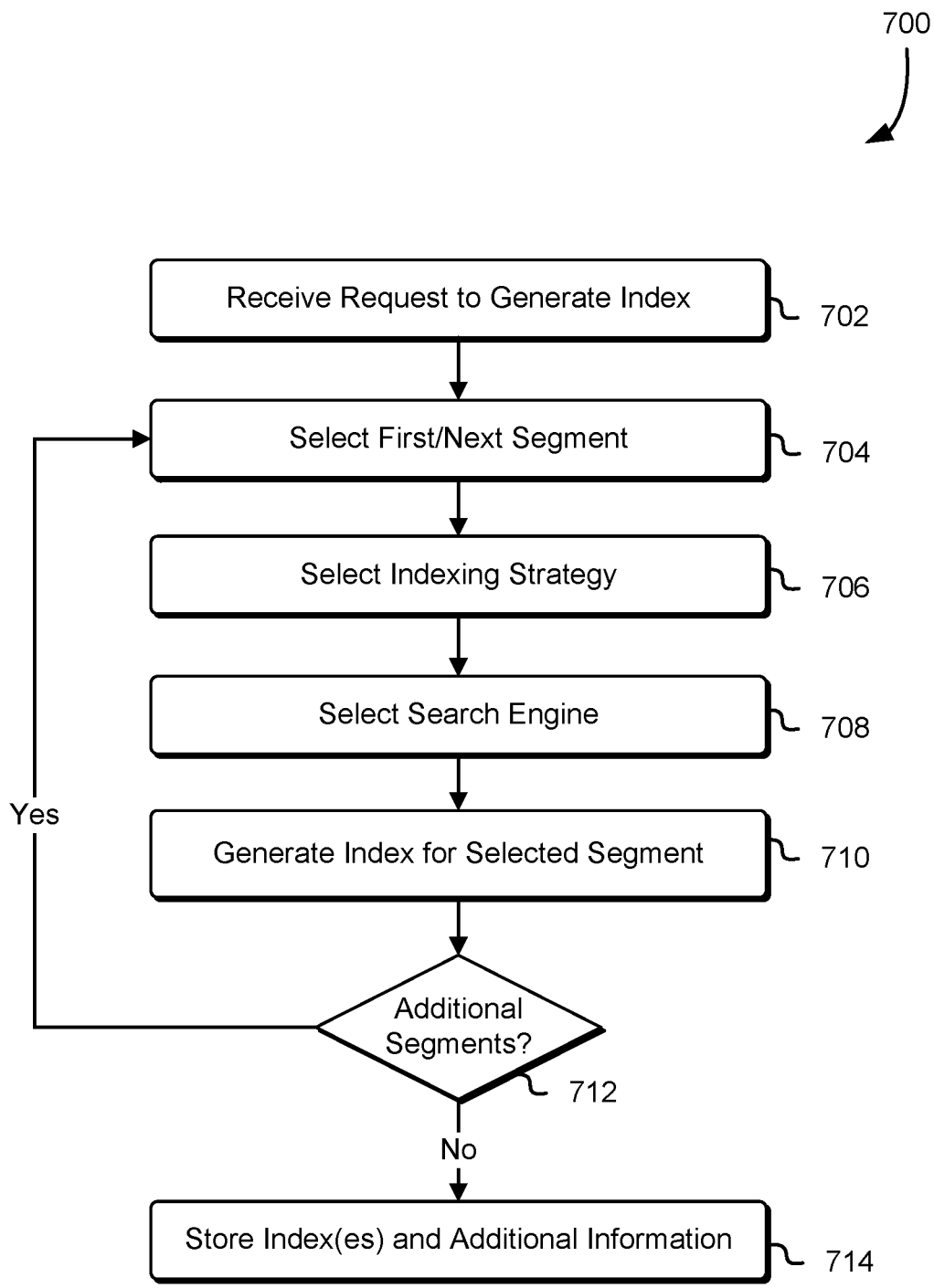
FIG. 7 shows an illustrative process which may be used to generate indexing information for content using a plurality of indexing strategies in accordance with at least one embodiment.

FIG. 7 is a block diagram illustrating an example of a process 700 for generating an index in accordance with at least one embodiment. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 100 described in conjunction with FIG. 1, such as the search server 102, by multiple computing devices in a distributed system of a computing resource service provider, or by a service provided by a computing resource service provider. The process 700 includes receiving a request to generate an index 702. In one example, the request is submitted by a user and indicates documents to be indexed. In yet another example, the request is generated by a system or service of a computing resource service provider as part of a process to create a new user and/or new account.

In step 704, the search server selects a first/next segment. As described above, content associated with a user may be segmented so that different indexing and/or search strategies may be applied and tested. The segment, in various embodiments, includes a percentage of the total amount of content available to the search server to index. For example, 95% of the content is included in a first segment to be indexed according to a known effective indexing strategy and 5% of the content is included in a second segment to be indexed according to an indexing strategy under test. Furthermore, selection of the content to include in a segment may be made according to various conditions such as randomly, according to content type, content owner, content size, a date associated with content, or any other attributes of the content.

In step 706, the search server selects an indexing strategy. As described above, the indexing strategy is selected based at least in part on the segment. Returning to the example above, when the second segment is selected, the search server selects the indexing strategy under test. Furthermore, similarly as above, the indexing strategy may be selected according to various conditions and/or attributes of the segment and/or content, such as the size, date of creation, content type, user profile associated with content, or any other attributes suitable for selecting an indexing strategy. In yet another example, the indexing strategy is selected from a set of indexing strategies according to a selection algorithm. For example, the indexing strategies are selected according to a round robin selection algorithm.

In step 708, a search engine is selected. The search engine may include any system of service that is capable of storing the index and searching the index using tokens generated from a search query. In step 710, the search engine generates an index for the selected segment. As described above, generating an index includes a set of operations to generate tokens for content. For example, words in the content may be normalized and/or tokenized according to the selected indexing strategy and the resulting information may be stored as an index. The search server then determines if there are additional segments to be created 712. For example, if the request indicates a number of segments to create and the process 700 has yet to cause the number of segments to be created. In another example, additional segments are created if there remains content associated with the user that has not been indexed. If the search server determines to generate additional segments, the process 700 returns to step 704 and the process is continued as described above. If the search server determines not to generate additional segments the process 700 continues to step 714.

In step 714, the search server persists the index in a data store and additional information associated with the generation of the index. In various embodiments, the index is stored in a separate storage location from the additional information. For example, the additional information is stored in a database such as the index strategy information as described above in connection with FIG. 1. Furthermore, the additional information may indicate information associated with the segments, search engine, and/or indexing strategy. For example as described above, the additional information enables the search server, when conducting a search, to determine search strategies to use to execute searches of various segments indicated in the additional information.

Note that one or more of the operations performed in 702-714 may be performed in various orders and combinations, including in parallel. For example, the system executing the process 700 may execute the steps 704-710 for a plurality of segments in parallel. In numerous variations to the process 700, one or more of the operations 702-714 may be omitted or performed by other systems or services.

Figure 8:
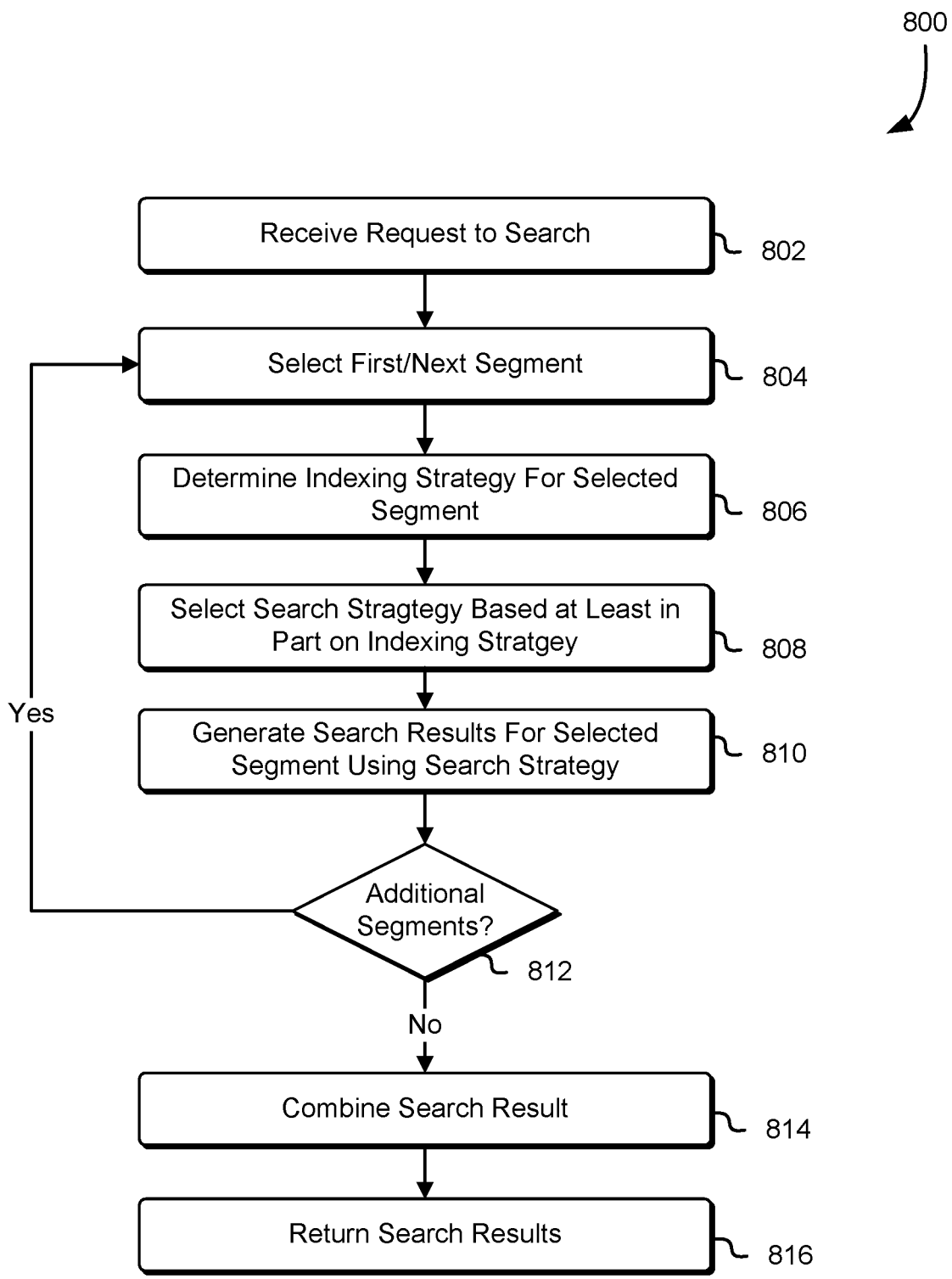
FIG. 8 shows an illustrative process which may be used to return search results using a plurality of searching strategies in accordance with at least one embodiment.

FIG. 8 is a block diagram illustrating an example of a process 800 for generating a search result in accordance with at least one embodiment. Some or all of the process 800 (or any other processes described, or variations, and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 800 may be performed by any suitable system, such as a server in a data center, by various components of the environment 200 described in conjunction with FIG. 2, such as the search server 202, by multiple computing devices in a distributed system of a computing resource service provider, or by a service provided by a computing resource service provider. The process 800 includes receiving a request to perform a search 802. In one example, the request is submitted by a user and indicates documents to be searched. In yet another example, the request is generated by a system or service of a computing resource service provider as part of additional related searches in response to an operation of a user. The search request may be generated as a result of an interaction with a webpage as described above in connection with FIG. 3.

In step 804, the search server selects a first/next segment. As described above, content may be segmented so that different indexing and/or search strategies may be applied and tested. The segment, in various embodiments, includes a percentage of the total amount of content available to the search server to index. For example, 95% of the content is included in a first segment to be indexed according to a known effective indexing strategy and 5% of the content is included in a second segment to be indexed according to an indexing strategy under test. Furthermore, selection of the content to include in a segment may be made according to various conditions such as randomly, according to content type, content owner, content size, a date associated with content, or any other attributes of the content.

In step 806, the search server determines an indexing strategy. As described above, the indexing strategy is selected based at least in part on the segment. As described above, the indexing strategy may be selected according to various conditions and/or attributes of the segment and/or content, such as the size, date of creation, content type, user profile associated with content, any other attributes suitable for selecting an indexing strategy. In addition, information indicating the indexing strategy used for the selected segment may be stored in a database as additional information as described above in connection with FIG. 7.

In step 808, the search server selects a search strategy based at least in part on the indexing strategy. In various embodiments, the search server maintains information indicating compatible search strategies for particular indexing strategies. The selection of a search strategy may be made based at least in part on a variety of conditions as described above, such as segment information, content of the segment, selection algorithm, the set of available search strategies, or other conditions suitable for selecting a search strategy. For example, a certain percentage of searches use a search strategy under test.

In step 810, the search engine generates a search result for the selected segment based at least in part on the selected search strategy. As described above, generating search results includes a set of operation to generate tokens from the search query. For example, words in the query are normalized and/or tokenized according to the selected search strategy and the resulting information is search for in the index. The search server then determines if there are additional segments to be searched 812. For example, if the request indicates a number of segments to search and the process 800 has yet to cause the number of segments to be searched. In another example, additional content remains to be searched. If the search server determines to search additional segments, the process 800 returns to step 804 and the process is continued as described above. If the search server determines not to search additional segments the process 800 continues to step 814.

In step 814, the search server combines the search results for the segments searched 814. As described above, the search server may normalize the search results, for example, the ranking and/or relevance information is normalize so that the results of a particular search strategy are not over or under ranked relative to the results of other search strategies. In various embodiments, the search server orders the results from the different search strategies according to a ranking algorithm. For example, the search server orders the results (e.g., documents returned by the search strategies) according to date, where the more the recent results (e.g., date created or date received) are ordered higher.

In step 816, the search server returns the search results. For example, the search server may return the results to a webpage as described above in connection with FIG. 3. Note that one or more of the operations performed in 802-816 may be performed in various orders and combinations, including in parallel. For example, the system executing the process 800 may execute the steps 804-810 for a plurality of segments in parallel. In numerous variations to the process 800, one or more of the operations 802-816 may be omitted or performed by other systems or services.

Figure 9:
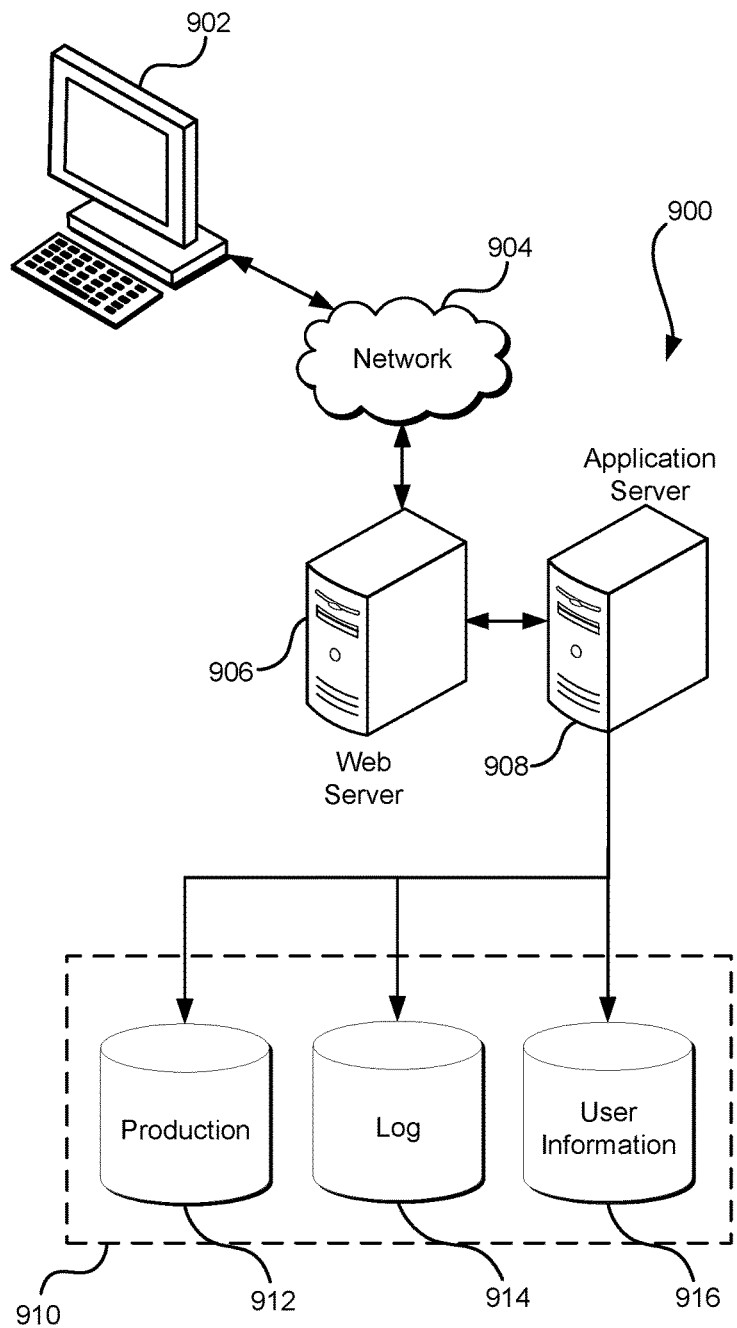
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C"

refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining content, the content comprising a plurality of content items;
   processing the content to generate a plurality of indexes for searching the content;
   determining a plurality of segments of the content, the plurality of segments comprising: a first segment, grouping a first subset of the plurality of content items according to a first characteristic, and a second segment, grouping a second subset of the plurality of content items according to a second characteristic;
   generating the plurality of indexes by at least:
      associating a first indexing strategy of a plurality of indexing strategies with the first segment;
      generating a first index of the plurality of indexes based at least in part on the first indexing strategy and the first segment;
      associating a second indexing strategy of the plurality of indexing strategies with a second segment of the plurality of segments; and
      generating a second index of the plurality of indexes based at least in part on the second indexing strategy and content associated with the second segment;
   storing the first index and first additional information associating the first indexing strategy and the first segment with the first index;
   storing the second index and second additional information associating the second indexing strategy and second segment with the second index;
   performing a test of the first index and the second index using a set of queries to generate a set of results;
   determining a measure of effectiveness for the first index and the second index based at least in part on the set of results; and
   applying the first index to a first number of the plurality of segments of the content and the second index to a second number of the plurality of segments of the content based at least in part on the measure of effectiveness.

2. The computer-implemented method of claim 1, wherein generating the plurality of indexes further comprises:
   associating the first indexing strategy of the plurality of indexing strategies with a third segment; and generating a third index of the plurality of indexes based at least in part on the first indexing strategy and the third segment.

3. The computer-implemented method of claim 1, wherein the computer-implemented method further comprises:
receiving a search request including a search query;
determining fulfillment of the search request includes a search of the first segment;
selecting a search strategy based at least in part on the first indexing strategy; and
executing a search of the first segment based at least in part on the search strategy.

4. The computer-implemented method of claim 3, wherein the computer-implemented method further comprises:
obtaining metric information associated with a search executed using the first segment; and
modifying the first indexing strategy based at least in part on the metric information.

5. A system, comprising:
one or more processors; and
memory that stores computer-executable instructions that, as a result of being executed, cause the system to:
obtain a plurality of content items;
generate a plurality of indexing strategies for searching the plurality of content items;
determine a plurality of segments of the plurality of content items, the plurality of segments comprising: a first segment that groups a first subset of the plurality of content items according to a first characteristic and a second segment that groups a second subset of the plurality of content items according to a second characteristic;
select a first indexing strategy of the plurality of indexing strategies for the first segment of the plurality of segments;
select a second indexing strategy of the plurality of indexing strategies for the second segment of the plurality of segments;
generate a first index of a plurality of indexes based at least in part on the first indexing strategy and the first segment;
generate a second index of the plurality of indexes based at least in part on the second indexing strategy and the second segment;
store the first index and the second index such that the first segment is associated with the first indexing strategy and the second segment is associated with the second indexing strategy;
determine an effectiveness of the first index and the second index based at least in part on a plurality of query results generated by at least performing a set of queries using the first index and the second index;
apply the first index to a first number of the plurality of segments and the second index to a second number of the plurality of segments based at least in part on the effectiveness;
obtain metric information indicating user operations performed during a search session associated with the first index; and
update the first index based at least in part on the metric information and the effectiveness.

6. The system of claim 5, wherein the plurality of content items includes a set of documents used to test various indexing strategies.

7. The system of claim 5, wherein the first indexing strategy further comprises a stemming strategy.

8. The system of claim 5, wherein the second indexing strategy further comprises a lemmatization strategy.

9. The system of claim 5, wherein memory further includes computer-executable instructions that, as a result of being executed, cause the system to modify the first indexing strategy based at least in part on the metric information.

10. The system of claim 5, wherein memory further includes computer-executable instructions that, as a result of being executed, cause the system to execute a plurality of searches of the plurality of content items, where the plurality of searches includes a set of curated searches.

11. The system of claim 5, wherein the metric information includes a response from a user indicating the user found relevant results in a list of results generated by a search using the first index or the second index.

12. The system of claim 5, wherein memory further includes computer-executable instructions that, as a result of being executed, cause the system to modify the first index and second index such that a third segment of the plurality of segments is associated with the first indexing strategy and a fourth segment of the plurality of segments is associated with the second indexing strategy.

13. A non-transitory computer-readable storage medium storing thereon executable instructions that, as a result of being executed by one or more processors of a computer system, cause the computer system to at least:
obtain a plurality of content items;
determine a plurality of segments of the plurality of content items, the plurality of segments used to generate a plurality of indexes, where the plurality of segments comprise at least a first segment of a first subset of the plurality of content items based at least in part on a first characteristic and a second segment of a second subset of the plurality of content items based at least in part on a second characteristic;
select, for the first segment of the plurality of segments, a first indexing strategy of a plurality of indexing strategies;
select, for the second segment of the plurality of segments, a second indexing strategy of the plurality of indexing strategies;
generate a first index for content of the first segment using the first indexing strategy;
generate a second index for content of the second segment using the second indexing strategy;
store information indicating a first association of the first segment and the first indexing strategy and a second association of the second segment and the second indexing strategy;
generate a set of search results based at least in part on executing a set of test search queries using the first association and the second association;
obtain a first set of metrics indicating an effectiveness of the first association and the second association based at least in part on the set of search results;
apply the first index to a first number of the plurality of segments and the second index to a second number of the plurality of segments based at least in part on the effectiveness; and
modify the first indexing strategy based at least in part on a first set of metrics where a metric of the first set of metrics is associated with a user's interaction with a result of a first search strategy.

14. The non-transitory computer-readable storage medium of claim 13, wherein the instructions further comprise instructions that, as a result of being executed by the one or more processors, cause the computer system to fulfill a search request by at least obtaining the information indicating the first association and the second association.

15. The non-transitory computer-readable storage medium of claim 14, wherein the instructions further comprise instructions that, as a result of being executed by the one or more processors, cause the computer system to select the first search strategy to fulfill the search request based at least in part on the first association, the first search strategy to be executed on the first segment.

16. The non-transitory computer-readable storage medium of claim 13, wherein the instructions further comprise instructions that, as a result of being executed by the one or more processors, cause the computer system to determine to:
  execute a first search of the first segment using a first search strategy;
  execute a second search of the second segment using a second search strategy; and
  combine the results of the first search strategy and the second search strategy.

17. The non-transitory computer-readable storage medium of claim 13, wherein the instructions further comprise instructions that, as a result of being executed by the one or more processors, cause the computer system to determine to modify the first search strategy based at least in part on the user's interaction.

18. The non-transitory computer-readable storage medium of claim 17, wherein the instructions further comprise instructions that, as a result of being executed by the one or more processors, cause the computer system to determine to replace the first indexing strategy with a third indexing strategy based at least in part on determining to modify the first indexing strategy.

19. The non-transitory computer-readable storage medium of claim 13, wherein the instructions further comprise instructions that, as a result of being executed by the one or more processors, cause the computer system to determine to generate a third index for content of the first segment using a third indexing strategy.

20. The non-transitory computer-readable storage medium of claim 13, wherein the instructions further comprise instructions that, as a result of being executed by the one or more processors, cause the computer system to, as a result of modifying the first indexing strategy, store a third association of the second segment and the first index.

\* \* \* \* \*